Figure 1:
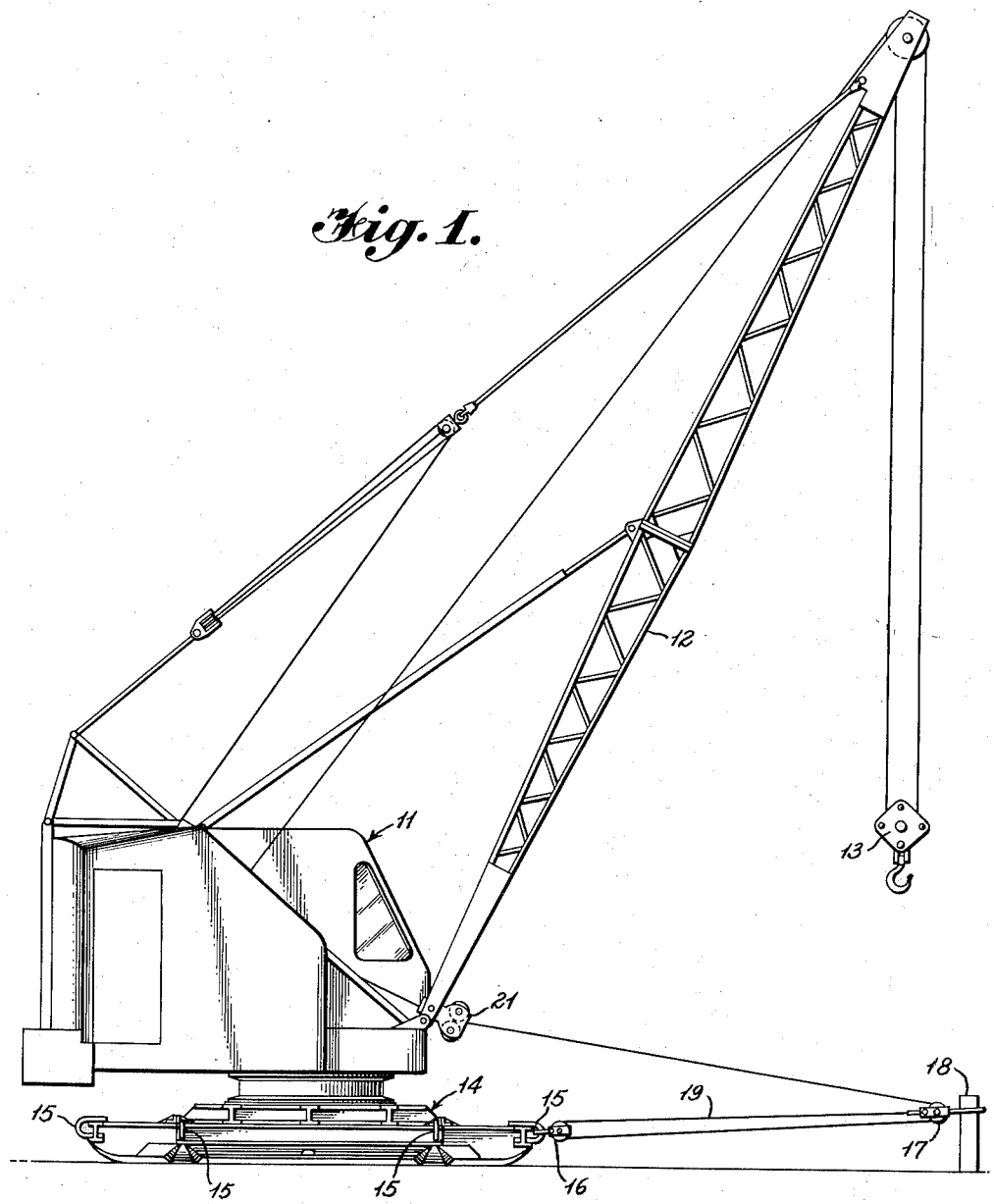

April 29, 1958     C. D. DODGEN     2,832,605
SKID MOUNT FOR CONSTRUCTION AND EXCAVATING EQUIPMENT
Filed Nov. 17, 1954     4 Sheets-Sheet 1

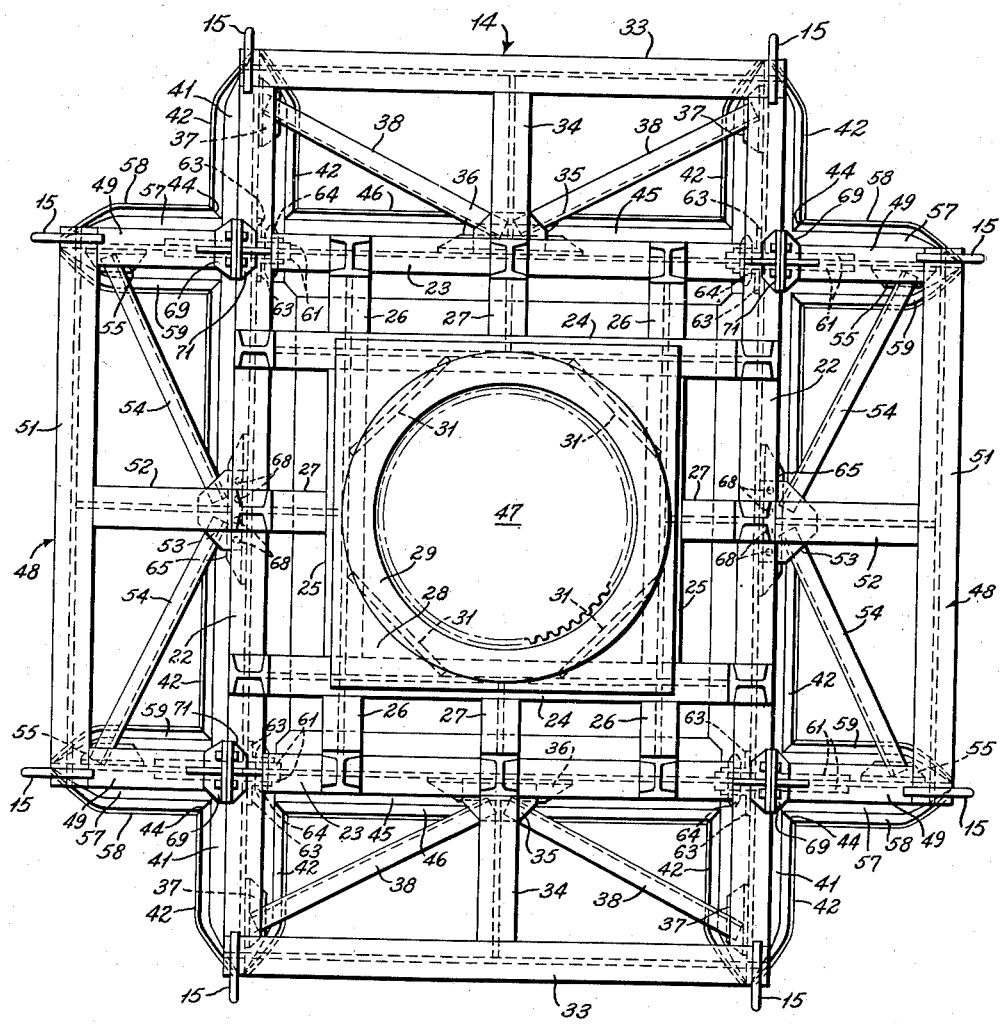

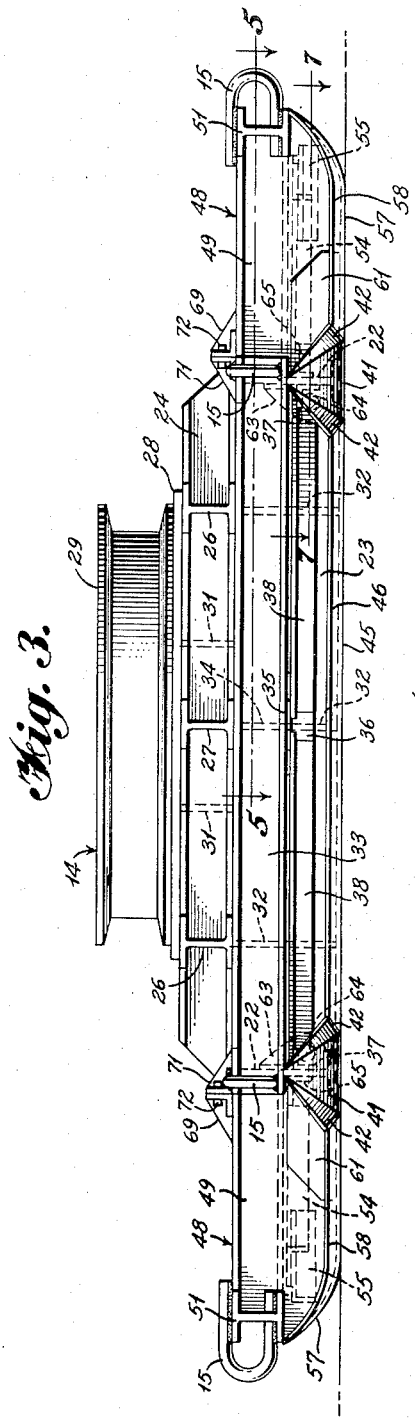
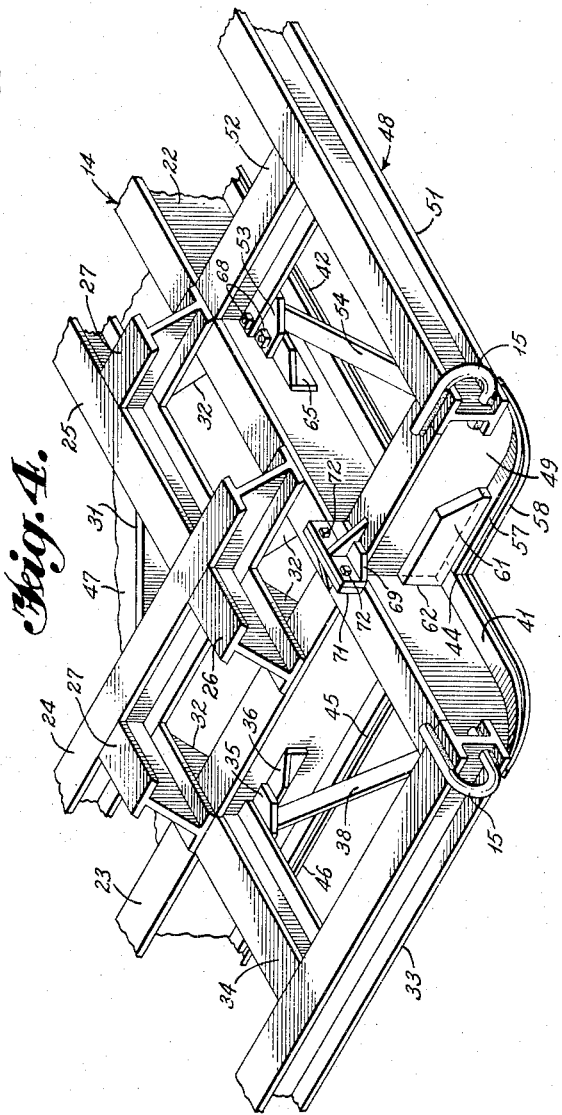

April 29, 1958  C. D. DODGEN  2,832,605
SKID MOUNT FOR CONSTRUCTION AND EXCAVATING EQUIPMENT
Filed Nov. 17, 1954  4 Sheets-Sheet 4
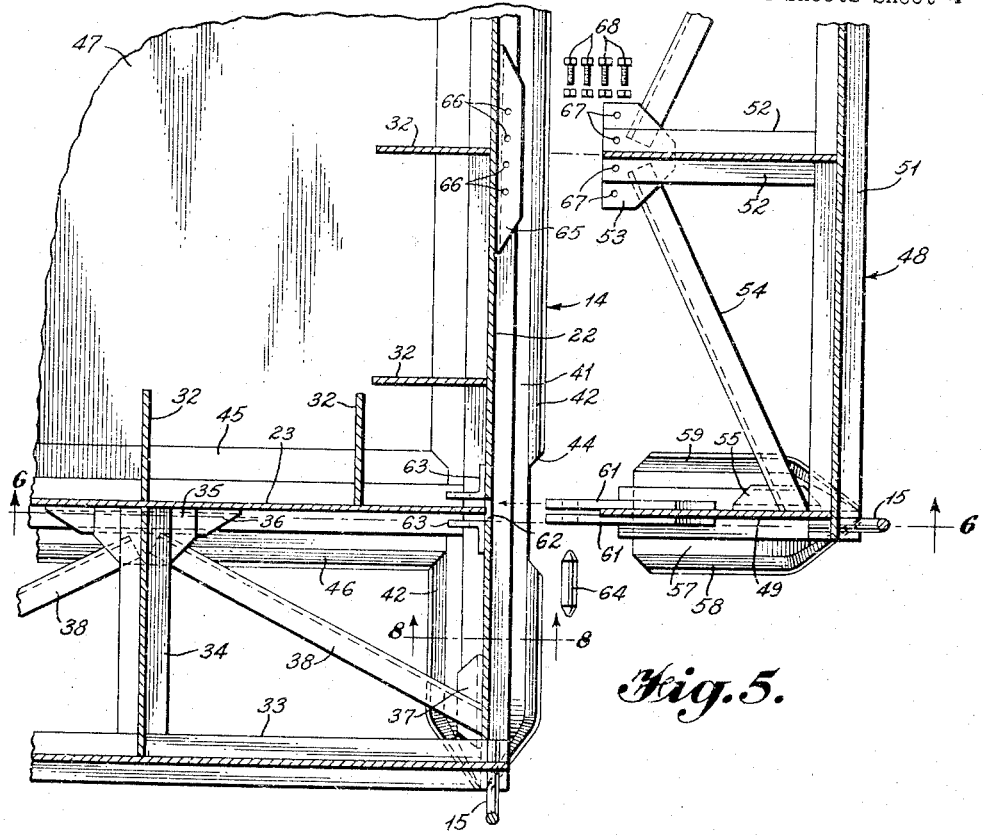
Fig. 5.
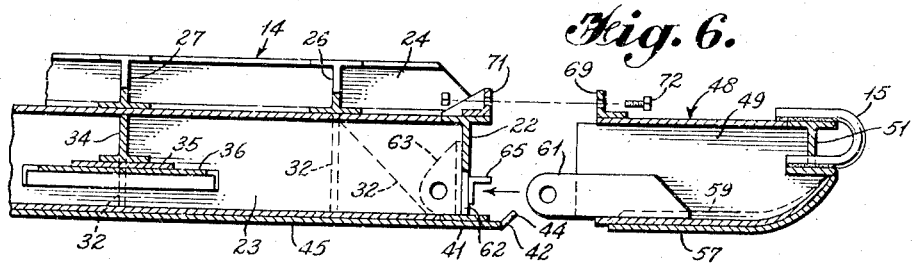
Fig. 6.
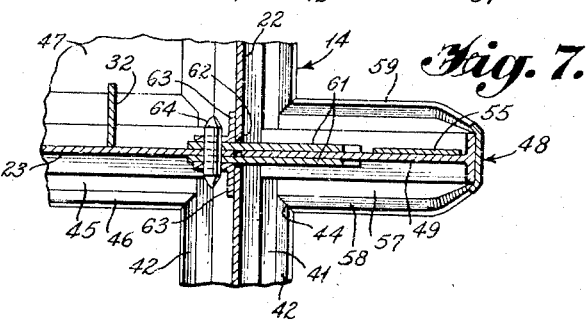
Fig. 7.
Fig. 8.
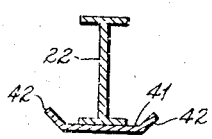

United States Patent Office 2,832,605
Patented Apr. 29, 1958

2,832,605

SKID MOUNT FOR CONSTRUCTION AND EXCAVATING EQUIPMENT

Carroll D. Dodgen, Houston, Tex., assignor to Link-Belt Speeder Corporation, a corporation of Illinois Application November 17, 1954, Serial No. 469,382

10 Claims. (Cl. 280—12)

This invention relates to new and useful improvements in skid mounts for cranes, and the like, and deals more particularly with skid structures which provide increased stability and ground bearing areas for construction and excavating equipment.

In the construction and excavating field, it has been common practice to mount self-propelled, revolving cranes, and related types of equipment, on frames or sub-bases of the crawler or wheeled type. While equipment that is so mounted is satisfactory for many activities, there are others where its use presents certain limitations and disadvantages.

For example, the regulations of most States place a limitation of eight feet on the overall width of the tread structures of construction and excavating equipment that is transported over their highways. Because the distance between the centerlines on the tread structures determines the width of the effective base of such equipment, the center of gravity of the crane, plus the load being handled, must fall between these centerlines to provide the required stability against tipping when the crane structure is swung to either side of its normal line of travel.

Another disadvantage inherent in crawler or wheel mounted construction and excavating equipment is the limited amount of ground bearing area that is afforded by the crawler tracks and the ground contacting portions of the wheels. Thus, when such equipment must be operated on soft terrain having low bearing values, it is necessary to construct special road beds, usually formed of heavy timbers or logs, for the equipment to travel over and to stand on while in operation.

It is the primary object of this invention to provide a skid mount for construction and excavating equipment which will permit the latter to be operated over soft terrain without the need for constructing any form of road bed, or other auxiliary load bearing supporting surface.

A further important object of the invention is the provision of a skid mount which will support construction and excavating equipment for forward and reverse movements in either of two right angularly arranged directions.

Still another important object of the invention is to provide a skid mount for cranes, or the like, which will afford substantially uniform stability for all permissible operating positions of the swingable crane body.

A further object of the invention is to provide a skid mount which has a total ground bearing area that exceeds the horizontal cross-sectional area of the main body of the unit.

Still another object of the invention is to provide a skid mount for construction and excavating equipment which readily may be partially disassembled to place it within the maximum dimensional limitations governing its transportation over public highways.

Other objects and advantages of the invention will be apparent during the course of the following description.

In the accompanying drawings forming a part of this specification, and in which like reference characters are employed to designate like parts throughout the same, Figure 1 is a side elevational view of a crane body carried by the type of skid mount which embodies this invention, Figure 2 is a top plan view of the skid mount portion of the structure illustrated in Fig. 1, Figure 3 is an end elevational view of the skid mount of Fig. 2, Figure 4 is a fragmentary perspective view showing one of the four similar corner portions of the skid mount, Figure 5 is a fragmentary horizontal sectional view taken on line 5—5 of Fig. 3 but showing an outrigger frame disassembled from the main body of the skid mount, Figure 6 is a vertical sectional view taken on line 6—6 of Fig. 5, Figure 7 is a fragmentary sectional view taken on line 7—7 of Fig. 3, and Figure 8 is a vertical sectional view taken on line 8—8 of Fig. 5.

In the drawings, wherein for the purpose of illustration is shown the preferred embodiment of this invention, and first particularly referring to Fig. 1, there is shown a crane body 11 of standard construction that is provided with a boom 12 and a hook block 13. It is to be understood that the skid mount of this invention is not limited in its use to cranes but is equally applicable for supporting other forms of construction and excavating equipment, such as shovels, trench hoes, and draglines.

The crane body 11 is supported on the skid mount designated in its entirety by the reference character 14, which is provided with coupling members 15 at each of its four sides and ends so that a block 16 may be easily and quickly attached thereto. A second block 17 is attached to any convenient fixed object, such as the post 18, and a cable 19 is reaved through the two blocks and the fair-lead 21 to a suitable drum, not shown, which forms a part of the conventional crane structure. It will be apparent, after the skid mount structure embodying this invention is fully described, that by properly arranging the illustrated block and tackle mechanism and connecting it to the appropriate coupling members 15, the equipment may be moved in any desired direction.

Referring now to Figs. 2 to 8, inclusive, for a detail description of the skid mount 14, it will be seen that the main frame or body portion is substantially square in plan view and includes two parallel I-beams 22 at its opposite sides which are connected adjacent their ends by the two I-beams 23. It will be seen in Fig. 2 that the two side I-beams 22 extend outwardly in opposite directions beyond the ends of the main frame that are defined by the I-beams 23. Welded to the tops of and spanning the space between the side I-beams 22, at locations adjacent the end I-beams 23, are two H-beams 24. These beams 24 are interconnected by similar H-beams 25 at locations adjacent the side I-beams 22. Stub beams 26 are arranged in alignment with the opposite ends of the H-beams 25 and are connected to and extend between the beams 24 and the tops of the I-beams 23. A similar stub beam 27 is suitably connected to the middle of each of the beams 24 and 25 and extends outwardly therefrom for connection to the top of the adjacent I-beam 22 or 23.

Resting upon and suitably connected to the tops of the H-beams 24 and 25 is a support plate 28 which has mounted thereon the flanged turntable member 29 for cooperating with hook rollers, or the like, by means of which the crane body is rotatably mounted on the skid mount 14 in a conventional manner. Braces 31 are arranged in the four corners of the square formed by the H-beams 24 and 25. As best illustrated in Figs. 4 and 5, stiffening webs 32 extend between and connect the webs of the I-beams 22 and 23 and the bottom flanges of H-beams 24, 25, 26 and 27.

The corresponding projecting ends of the two side I-beams 22 are connected by H-beams 33 and the middle of each H-beam 33 is connected to the adjacent I-beam 23 by an H-beam 34. At the inner end portion of each beam 34 there is connected a web member 35 and an angular bracket 36 which are in turn connected to the web of the I-beam 23. Connected to each web member 35 and extending therefrom to a bracket 37, fastened to the projecting outer end of each I-beam 22, is an angle member 38. A coupling eye 15 is provided for each end of each I-beam 22 by the U-shaped member that is welded to the tops of the upper and lower flanges of the H-beams 33.

A skid runner strip 41 is mounted on the bottom flange and extends along the entire length of each I-beam 22. Each of these runner strips 41 has its outer end portion curved upwardly and both edges of these end portions are inclined upwardly and outwardly to provide bevels 42. This beveled edge formation 42 extends the length of the outer edge of each one of the runner strips 41. The bevel 42 at the outer edge of each runner strip 41 is notched at 44 in alignment with the I-beams 23 for a purpose that will be described later.

A skid runner strip 45 is mounted on the bottom flange of each I-beam 23 and extends between the runners 41. The outer edge portion of each runner strip 45 is upwardly and outwardly inclined to provide a bevel 46 which is joined at its opposite ends to the inner bevels 42 of the projecting end portions of the runner strips 41.

A runner plate 47 is welded, or similarly connected, to and functions as a continuation of the unbeveled inner edge portions of the runner strips 45 and 41 to cover the entire bottom area of the main frame of the skid mount 14.

Detachably mounted on the outer side of each of the I-beams 22 is an outrigger frame designated in its entirety by the reference character 48. Each such frame is formed with a pair of I-beams 49 having their outer end portions connected by an H-beam 51. The length of the I-beams 49 is substantially equal to that of the end portions of the I-beams 22 which project beyond the I-beams 23 and the spacing between the I-beams 49 is equal to that of, and thereby function as extensions of, the I-beams 23.

Connected to the middle of each H-beam 51 and projecting inwardly therefrom to the associated I-beam 22 is a second H-beam 52. The inner end portion of the beam 52 has welded to the bottom thereof a web member 53 while angle members 54 are welded to the bottom of the web member 53 and extend diagonally therefrom to the brackets 55 fastened to the outer end portions of the I-beams 49. A draft coupling eye 15 is provided at each end of the H-beam 51 by the U-shaped members that are welded to the tops of the upper and lower flanges of the H-beam 51. It will be noted that the above described structure of each outrigger frame is identical to that of each portion of the skid mount 14 which lies outwardly of each I-beam 23.

Mounted on the bottom of each I-beam 49 is a skid runner strip 57 the outer and inner edge portions of which are inclined upwardly and outwardly to provide bevels 58 and 59, respectively, that are similar to the bevels 42 of the runner strips 41. The outer end portion of each runner strip 57 is curved upwardly, as best illustrated in Fig. 6. The inner end portion of each runner strip 57 is formed to fit into one of the notches 44 of the bevel 42 of the associated runner strip 41 so that the runner strips 57 form continuations of the runner strips 45 on the bottoms of the I-beams 23.

Each outrigger frame 48 is detachably connected to the outer side of its associated I-beam 22 by means of coupling plates 61 that are welded to the opposite sides of the webs of the I-beams 49 and project inwardly therefrom through the openings 62 in the web of the I-beam 22. When so positioned, the plates 61 lie on opposite sides of the web of the I-beam 23 and between the angle brackets 63 that are mounted on the web of the I-beam 22. Aligned openings are provided in the brackets 63, plates 61 and the web of the I-beam 23 for receiving the pin 64 which is tapered at both of its end portions to facilitate driving into the aligned openings.

The middle portion of each outrigger frame 48 is further detachably connected to its associated I-beam 22 by means of the angle bracket 65 which is welded to the outer side of the web of the I-beam 22. The bracket 65 is provided with a series of openings 66 therein which match the openings 67 through the web member 53 and the flange of the H-beam 52 to which it is connected. These matched openings 66 and 67 receive bolts 68 by means of which the outrigger frame 48 is connected to the bracket 65. A still further connection between each outrigger frame 48 and its associated I-beam 22 is provided by angle brackets 69 and 71 that are mounted on the tops of the I-beams 49 and 22, respectively. The brackets 69 and 71 are provided with aligned openings for receiving the bolts 72.

Referring now to the plan view of Fig. 2, it will be noted that the skid mount 14 is substantially symmetrical so that its tipping points will occur at the outer ends of the runner strips 57 and 41. It will be readily apparent, therefore, that the crane may be operated with its body 11 in any desired position and may be swung while carrying a full load without danger of tipping.

Further, the large bearing area provided by the runner strips 41, 45 and 57 and by the runner plate 47 will minimize the ground bearing pressure so that the crane may be operated over terrain having low ground bearing values.

As was previously described, movement of the crane to various operating positions is effected by attaching a suitable draft device to the skid mount 14 by means of the coupling eyes 15 which are so positioned around the periphery of the skid structure that the crane may be moved in any direction. When it is desired to transport the crane from one operating site to another, it may be pulled up a ramp, or the like, onto a trailer in the direction of the runner strips 41 and the outrigger frames 48 thereafter can be detached by removing the bolts 68 and 72 and the pins 64. The overall width of the skid mount then is reduced to the distance between the runner strips 41 which will not exceed the overall width that is allowed by all State highway regulations.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A skid mount for cranes or the like, comprising a rectangular main frame with coplanar bottom surfaces, a continuous runner structure underlying the entire bottom of said main frame and having its outer edge portion inclined outwardly and upwardly of the margin of said main frame, and a pair of runner strip extensions projecting outwardly from each of the sides and ends of the main frame, each of said runner extensions having a straight elongated bottom surface adjacent to and coplanar with the bottom surface of said continuous runner structure, said straight elongated bottom surfaces each comprising a major portion of the length of said extensions so as to considerably increase the stability of said mount by materially increasing its base dimensions.

2. A skid mount for cranes or the like, comprising a rectangular main frame having interconnected beams forming its side and end margins with the beams forming the side margins projecting outwardly uniform distances from the beams forming the end margins, two outrigger frames having interconnected beams forming their end margins, means for detachably connecting the ourigger frames to the outer sides of the beams forming the side margins of said main frame to reduce the overall width of the frame, and a skid runner strip connected to the bottom of and extending the entire length of each of the said beams forming the main frame and the two outriggers.

3. A skid mount as defined in claim 2 further characterized by a runner plate underlying the main frame between its side and end margins and joined at its edges to the skid runner strips which are connected to the bottoms of the beams forming the side and end margins of the main frame.

4. A skid mount for cranes or the like, comprising a rectangular main frame defined at its four margins by coplanar beams, and a runner structure underlying the entire bottom of said main frame, said runner structure comprising runner strips underlying and secured to the bottom surfaces of said marginal beams and a runner plate lying in the plane of and secured to all of the runner strips to form with the runner strips a continuous supporting surface underlying the entire main frame, all of the outer edges of the runner strips extending laterally and outwardly of the surfaces of the beams to which they are secured and being inclined upwardly.

5. A skid mount as defined in claim 4 further characterized by a runner strip extension projecting outwardly from the main frame relative to each end of each runner strip so as to provide two such extensions for each one of the four margins of the main frame, each of said runner strip extensions having a straight portion adjacent to and coplanar with said runner strips, and the runner strip extensions for two opposite margins of the main frame being detachable from said frame to reduce one overall dimension of the latter.

6. A skid mount for cranes or the like, comprising a rectangular main frame with coplanar bottom surfaces, a continuous runner structure underlying the entire bottom of said main frame and having its outer edge portions inclined outwardly and upwardly of the margin of said main frame, and a pair of runner strip extensions projecting outwardly from each of the sides and ends of the main frame, said runner strip extensions having straight portions adjacent to and coplanar with said continuous runner structure, the pairs of runner strip extensions projecting outwardly from the opposite ends being integral with the main frame, and the pairs of runner strip extensions projecting outwardly from the opposite sides being detachably connected to the main frame to reduce the overall width of the frame.

7. A skid mount as defined in claim 6 further characterized by the runner strip extensions projecting outwardly from either end of the main frame being in alignment with the runner strip extensions projecting outwardly from the other end and with the portions of the runner structure underlying the side margins of said frame, and the runner strip extensions projecting outwardly from either side of the main frame being in alignment with the runner strip extensions projecting outwardly from the other side and with the portions of the runner structure underlying the end margins of said frame.

8. A skid mount for cranes or the like, comprising a rectangular main frame defined at its four margins by coplanar beams, and a runner structure underlying all of the marginal portions of said main frame, said runner structure comprising runner strips underlying and secured to the bottom surfaces of said marginal beams, said runner strips being of greater width than the surfaces of the marginal beams to which they are secured so as to project laterally outwardly from said beams, the outwardly projecting portions of said runner strips being inclined upwardly and outwardly.

9. A skid mount as defined in claim 8 further characterized by a runner strip extension projecting outwardly from the main frame relative to each end of each runner strip so as to provide two such extensions for each one of the four margins of the main frame, each of said runner strip extensions having a straight portion adjacent to and coplanar with said runner strips and an end portion curved longitudinally upwardly from said straight portion, and each of said runner strip extensions also having both of its longitudinal edge portions inclined outwardly and upwardly.

10. A skid mount as defined in claim 9 further characterized by the runner strip extensions for two opposite margins of the main frame being detachable from said frame to reduce one overall dimension of the latter.

References Cited in the file of this patent

UNITED STATES PATENTS

| | | |
|---|---|---|
| 1,813,463 | Phillips | July 7, 1931 |
| 2,099,898 | Larkin | Nov. 23, 1937 |
| 2,215,830 | Gledhill | Sept. 24, 1940 |
| 2,219,905 | Prickman | Oct. 29, 1940 |
| 2,395,415 | Maier | Feb. 26, 1946 |
| 2,468,470 | Spieth | Apr. 26, 1949 |
| 2,538,599 | Swanson | Jan. 16, 1951 |
| 2,601,991 | Kahle | July 1, 1952 |
| 2,661,172 | Needham | Dec. 1, 1953 |
| 2,665,020 | Whittle | Jan. 5, 1954 |